United States Patent [19]

Bertolotti

[11] Patent Number: 4,678,423

[45] Date of Patent: Jul. 7, 1987

[54] DIE FOR HOT DIE FACE CUTTING THERMOPLASTIC POLYMERS

[75] Inventor: Franco Bertolotti, Milan, Italy

[73] Assignee: Montedison S.p.A., Milan, Italy

[21] Appl. No.: 696,740

[22] Filed: Jan. 31, 1985

[30] Foreign Application Priority Data

Feb. 2, 1984 [IT] Italy ................. 19387 A/84

[51] Int. Cl.⁴ .............................................. B29B 9/00
[52] U.S. Cl. .................................... 425/311; 264/142; 425/464
[58] Field of Search ............ 425/67, 311, 313, 382 R, 425/462, 464, 465, 466; 264/142, 176 F, 178 F

[56] References Cited

U.S. PATENT DOCUMENTS

| | | | |
|---|---|---|---|
| 3,516,120 | 6/1970 | Braun et al. | 425/311 |
| 3,599,285 | 8/1971 | Hamilton | 425/464 |
| 3,599,286 | 8/1971 | Karet | 425/464 |
| 3,618,162 | 11/1971 | Scharer et al. | 425/67 |
| 4,123,207 | 10/1978 | Dudley | 425/67 |
| 4,264,553 | 4/1981 | Loo | 264/142 |
| 4,327,050 | 4/1982 | Salmon | 425/464 |
| 4,564,350 | 1/1986 | Holmes et al. | 426/313 |

FOREIGN PATENT DOCUMENTS

| | | | |
|---|---|---|---|
| 2543450 | 4/1976 | Fed. Rep. of Germany | 425/311 |
| WO81/01980 | 7/1981 | PCT Int'l Appl. | 425/67 |

Primary Examiner—Jay H. Woo
Assistant Examiner—J. Fortenberry
Attorney, Agent, or Firm—Stevens, Davis, Miller & Mosher

[57] ABSTRACT

The die includes a body provided with a plurality of polymer flow channels and a plate fixed to the front surface of the body and bored at locations corresponding to each channel. An insulating layer is positioned between the body and the bored plate. The channels include a thermoregulating system for the die body. A plurality of nozzles is provided, with the nozzles being rooted inside the die body at locations corresponding to the channels. The nozzles protrude from the body itself to cross through the insulating layer and the bored plate. The nozzles are made of a metal having a thermal conductivity higher than 60 W/m°K.

14 Claims, 13 Drawing Figures

DIE FOR HOT DIE FACE CUTTING THERMOPLASTIC POLYMERS

BACKGROUND OF THE INVENTION

1. Field of the Invention

The present invention relates to a die for hot die face cutting of thermoplastic polymers.

More particulaly, the present invention relates to a die for hot die face pelletization of thermoplastic polymers by cutting the polymeric monofilaments directly on the front of the die.

2. Description of the Prior Art

Bibliographic and patent literature report different types of devices for hot die face pelletization of thermoplastic materials.

Such devices essentially comprise:

(a) a die consisting of a heated bored body;
(b) a cutting device including a rotating driving shaft provided with a blade mounting disk and a system to position the blades against the outer face of the die;
(c) a cutting chamber collecting the pellets, and
(d) a system for feeding and distributing a fluid, generally water controlled by a thermostat, necessary for cooling and carrying the cut pellets outside the cutting chamber.

The thermoplastic molten material is extruded through the die holes; the monofilaments coming out of the die are cut by the rotating blades and the pellets thus obtained are cooled and removed by means of the thermostated fluid.

The thermostated fluid is also intended to prevent adhesion of the pellets on the blades, on the die surface and on the other parts of the equipment and to prevent agglomeration of the pellets themselves.

The cutting operation can be performed by keeping the die completely immersed in the fluid (underwater pelletizing method) or by spraying the die with the fluid (water spray pelletizing method).

The main drawback of such known devices is that, in particular situations, the thermostated fluid cools the die at a rate greater than that at which heat can be restored by the thermoregulating system. As a consequence, the thermoplastic material solidifies (freezes) inside the die holes, and therefore, the extrusion process stops due to obstruction of the holes.

To overcome this drawback in the cases where the thermoregulating system of the die is unable to restore the heat losses, attempts where made to protect the die from a very intense cooling. Many methods were proposed for this purpose, such as: to reduce heat losses of the die, in correspondence to the surface in contact with the fluid, by inserting a layer of insulating material under the bored plate of the die or by externally coating the same; to thermally protect the molten polymer in die channels by internally coating each channel with insulating materials, etc.

All these methods, however, used alone or in combination, do not eliminate the problem of freezing of the polymer in the holes in a satisfactory way, especially during the device start-up, causing more or less serious drawbacks depending on the polymer type, the hole sizes, the polymer flow-rate and the processing conditions. Therefore, the performance is negatively affected with the following possible limitations: impossibility of reducing the polymer flow rate for each hole below critical values, impossibility of cooling the cutting area using fluid at a temperature below critical values, and so on.

SUMMARY OF THE INVENTION

An object of the present invention is to provide a die for hot die face cutting thermoplastic polymers, which avoids the problems of die orifice freezing up even under the most unfavourable thermal conditions, such as with dies having very reduced section of orifices (even lower than 0.05 mm$^2$); relatively low flow-rate of the polymer; relatively low polymer temperature, namely near its glass transition temperature (Tg); a temperature of the cooling fluid even lower than 15° C.; a die of small size, and so on.

It has now been found by the Applicant that this and other objects are achieved by means of a die comprising: a body provided with a plurality of channels for the polymer flow; a plate fixed to the front surface of said body and bored in correspondence to each channel, having the function of a cutting counterblade or die plate; a layer of insulating material positioned between the body and the bored plate; a thermoregulating system of the die body, involving at least the end part of the channels; a plurality of nozzles each rooted inside the die body in correspondence to each channel and protruding from the body itself, so as to cross the insulating layer and the bored plate and made of metal having thermal conductivity higher than 60 W/m°K.

The constructive details of each nozzle and its arrangement in the thermostated die body allow a thermal flux to be conveyed up to the free edge of the nozzle itself, which is so intense that the polymer is prevented from freezing.

The die body can be obtained in a single block or can consist of various elements assembled together.

The plate fixed to the die body is generally made of metal with possible superficial hardening and, since it is not subjected to the polymer pressure, it can have a reduced thickness, for instance lower than 10 mm.

The plate can be fixed to the die body with bolts or with fixing rings nuts or by means of welding. It is preferred to use a central ring nut and a peripheral one, possibly both provided with thermal insulation, and bolted onto the die body.

The insulating layer can consist of plastic materials or resins which are resistant to the die processing temperature—ranging between 100° and 300° C. The insulating layer can be air, gas, steam, compact or foamed materials of ceramic or vitreous type, and so on.

The insulating layer may be constituted by a single material or by any combination of several different materials. The thickness of the insulating layer can vary within a very wide range according to the polymer to be processed, the processing condtions, the type of insulating material being used, the material, the shape and the disposition of the nozzles, etc. Thicknesses ranging between 1 and 50 mm may generally be used.

The insulating material fills the hollow space between the die body and the plate, perfectly matching the external profile of the nozzle end part and the internal profile of the plate, and it insulates the nozzle up to its free end part.

The thermoregulating system can be of the channel type (heat-channel die plate) as well as of the heat exchange type (heat-exchange die plate). Any of the fluids known in this field can be used as the thermoregulating fluid.

However, the particular efficiency and extension of the insulation used in the die of the present invention make it possible to use diathermal oil as the thermoregulating fluid which, as is known, has a lower heat transfer coefficient than the other fluids.

The nozzles are made of metal materials having thermal conductivity higher than 60 W/m°K. Among the metal materials having such thermal conductivity are brasses, bronzes, copper and its alloys, aluminium and its alloys, etc. The metal material can possibly be hardened by coating or superficial treatment in correspondence to its surface in contact with the polymer.

The nozzles can be fixed to the polymer channels by fixed or removable fitting, by welding, or they can be a single block with channel itself. The nozzles can have different shapes according to rheological or insulating needs. Cylindrical, conical, pyramidal, step-like shapes or combinations of these shapes may be used. The cross section of the hole of each nozzle can be circular or of any other shape.

The wall thickness of each nozzle can vary between 0.1 and 50 mm and can be constant or variable along the length. The wall shape and thickness are selected to favour the thermal flow and to limit heat losses; for this purpose, small thickness of the walls at the nozzle free end part is preferred.

BRIEF DESCRIPTION OF THE DRAWINGS

The constructive and functional features of the die of the present invention can be better understood from the following detailed description, with reference to the figures of the attached drawings illustrating some preferred embodiments, as mere examples and with no limiting purpose of the present invention; wherein.

DESCRIPTION OF THE PREFERRED EMBODIMENT

Figure 1:
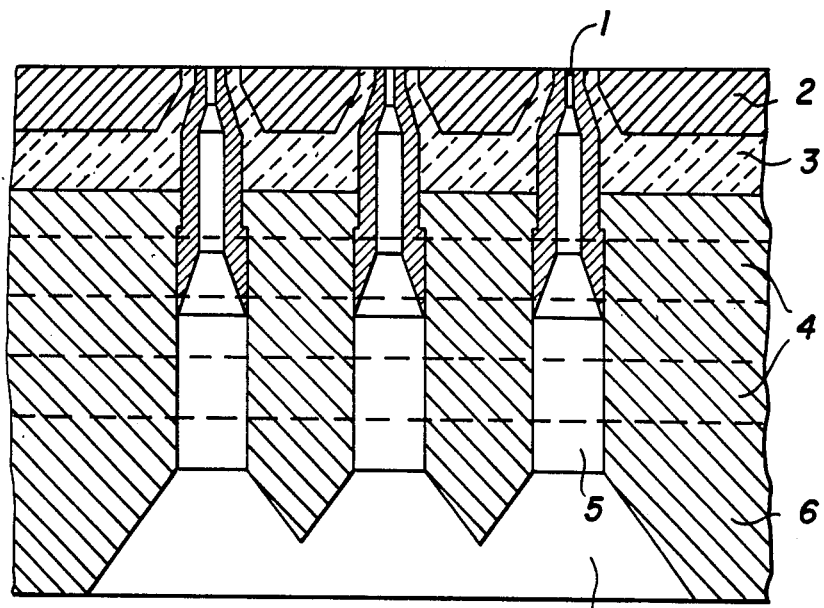
FIGS. 1, 2 and 3 are schematic views of the longitudinal section of three different embodiments of the die of the present invention.

With reference to the figures, the present die for hot die face cutting thermoplastic polymers comprises a body (6), a bored metal plate (2) and a layer (3) of insulating material positioned between the body (6) and the plate (2). The body (6) is provided with channels (5) for the polymer flow drilled in the body itself or applied to the same, each of them with a conical mouth (7). Each channel (5) is provided with a nozzle (1) made of material having a thermal conductivity higher than 60 W/m°K., rooted inside the die body (6) and coming out of the same so as to cross the insulating layer (3) and plate (2). Nozzle (1), at its bottom end, is in thermal contact with the thermostated die body (6) and, in its protruding part, is completely coated with the insulating material (3).

Figure 3:
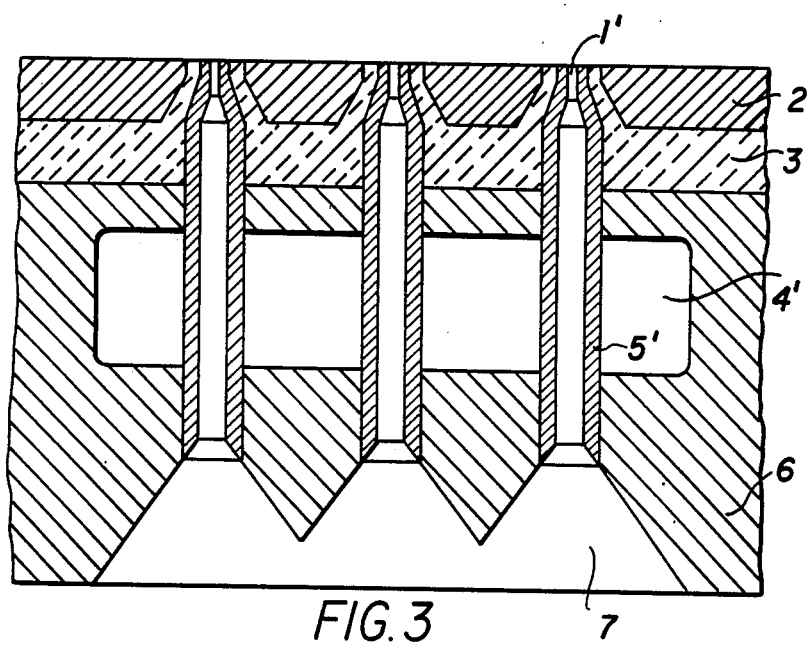
Figure 4:
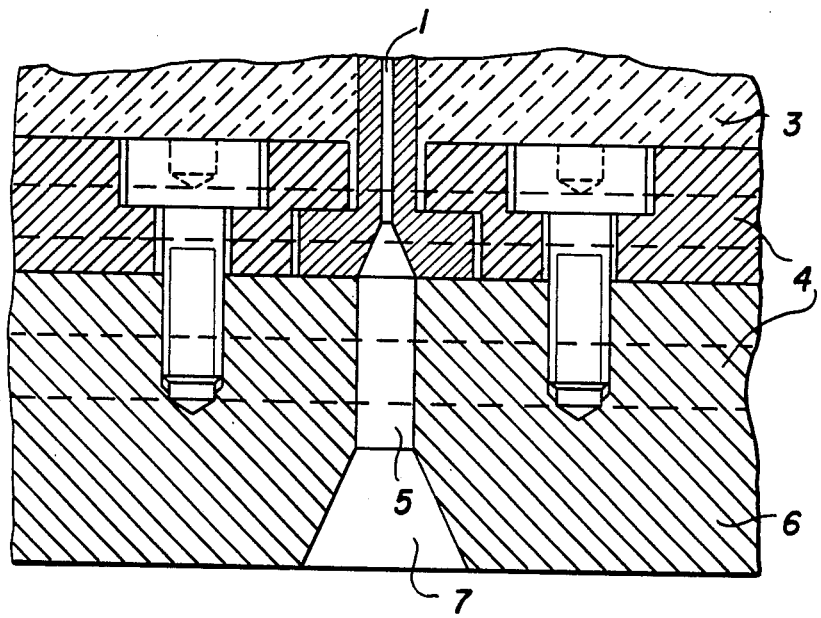
FIG. 4 is a schematic view similar to the previous figures where a particular type of nozzle fastening is illustrated.
Figure 5A:
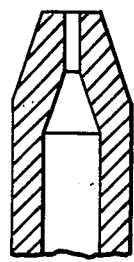
FIGS. 5A, 5B, 5C, 5D, 5E, 5F, 5G, 5H and 5I illustrate the longitudinal sections of some embodiments of the nozzle end.
Figure 5B:
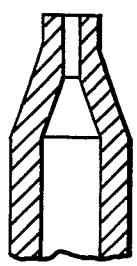
Figure 5C:
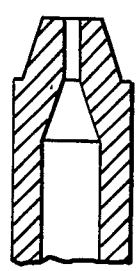
Figure 5D:
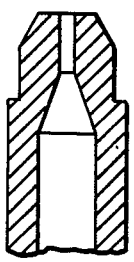
Figure 5E:
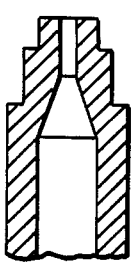
Figure 5F:
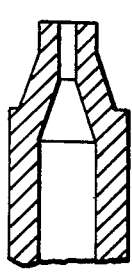
Figure 5G:
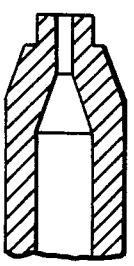
Figure 5H:
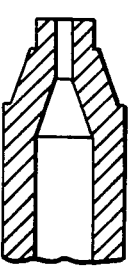
Figure 5I:
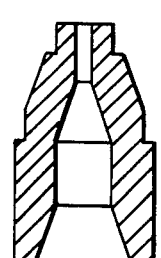

The nozzle (1) is fixed to the channel (5) by a fixed fitting with a stop shaped as a step (see FIGS. 1 and 2) or by a removable fitting (see FIG. 4). In the latter case, die body (6) is preferably constituted by two separate sections and the nozzles (1) are blocked between the aforesaid two sections fastened with screws. FIG. 3 illustrates a particular embodiment of the present die, wherein each nozzle (1') constitutes a single block with each channel (5').

The insulating layer (3) extends as far as to cover the end part of each nozzle (1) in order to prevent heat losses.

Figure 2:
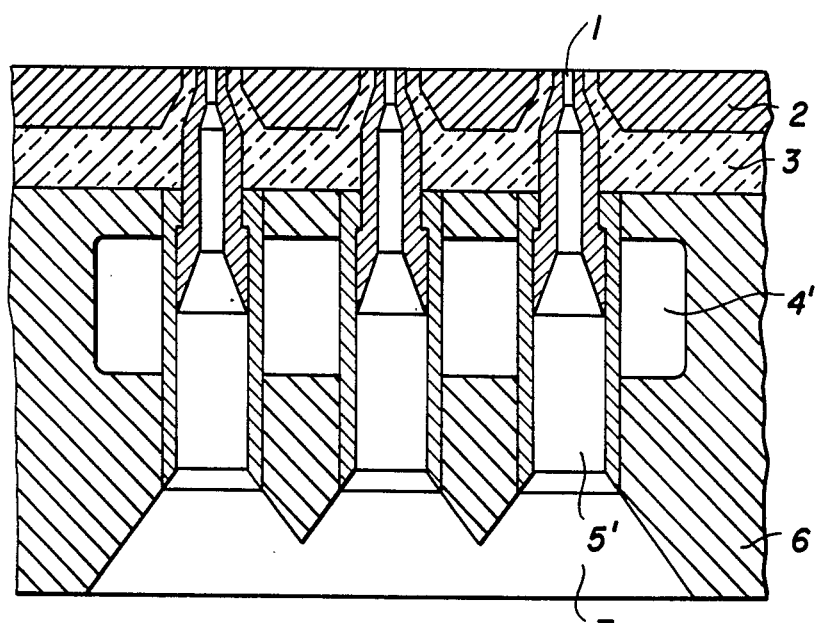

The thermoregulating system can comprise a plurality of channels (4), as shown in FIGS. 1 and 4, or a chamber (4'), as shown in FIGS. 2 and 3, in which the thermostated fluid is circulated.

The external profiles of the nozzle ends shown in FIG. 5 represent possible configurations which can be selected according to the process conditions in order to comply with different needs such as: to limit heat losses in the nozzles; to favour heat flow towrds the insulating-layer-enveloped end part of the nozzles; to provide a supporting and coupling surface for the insulating material, thus making it capable of avoiding penetration or infiltration of the process refrigerating fluid, especially when the fluid is under pressure. Thus, for example, embodiments 5A–5D have a lower dispersing surface, while other embodiments, such as for example 5E–5I, are endowed with better sealing.

Changes, modifications and variations may made in the embodiment of the present invention without departing from the scope thereof.

What I claim is:

1. A die for hot die face cutting thermoplastic polymers, comprising:
    a die body comprising a plurality of channels for polymer flow;
    a bored plate fixed to a front part of said die body and bored at locations corresponding to each channel, said bored plate having an outer surface acting as a cutting counterblade and an inner surface;
    a layer of insulating material positioned between the die body and the bored plate;
    said die body comprising a thermoregulating system for thermally regulating the die body at least an end part of said channels; and
    a plurality of nozzles, each nozzle being (i) rooted inside the die body at each location corresponding to said channels, (ii) protruding from the die body, and (iii) extending through the insulating layer and the bored plate, said insulating material closely fitting around an external configuration of respective end parts of said nozzles and to said inner surface and bored locations of said plate, wherein said insulating material envelopes said nozzles up to said end parts of said nozzles such that said nozzles do not contact said bored plate at any point, and said nozzles being made of a metal material having thermal conductivity higher than 60 W/m°K.

2. A die according to claim 1, wherein the plate fixed to the front part of the die body has a thickness lower than 10 mm.

3. A die according to claim 2, wherein the plate is made of a metal material with a superficial hardening.

4. A die according to claim 1, wherein the layer of insulating material is selected from the group consisting of: plastic materials, resins, air, gas, steam, compact and foamed materials of ceramic and vitreous type and combinations thereof.

5. A die according to claim 1, wherein the thickness of the insulating layer ranges between 1 and 50 mm.

6. A die according to claim 1, wherein said metal material has a thermal conductivity ranging between 100 and 400 W/m°K.

7. A die according to claim 1 or 6, wherein the metal material is hardened by either a coating or a superficial treatment at its surface which is in contact with the polymer.

8. A die according to claim 1, wherein the nozzles are fixed to the channels by either a fixed or a removable fitting.

9. A die according to claim 1, wherein the nozzles are fixed to the channels by welding.

10. A die according to claim 1, wherein each of the nozzles have a circular hole for polymer flow and an external configuration comprising a cylindrical, a conical, a pyramidal, or a step-like shape.

11. A die according to claim 1, wherein the thickness of the wall of each nozzle ranges between 0.1 and 50 mm.

12. A die according to claim 1, wherein the die body comprises two separate parts and the nozzles are blocked between said two parts.

13. A die according to claim 1, wherein the plate is fastened to the front part of the die body with bolts, with ring nuts or by welding.

14. A die according to claim 1, wherein each of the nozzles have a circular hole for polymer flow and an external configuration comprising any combination of a cylindrical, a conical, a pyramidal and a step-like shape.

* * * * *